No. 752,891. PATENTED FEB. 23, 1904.
G. B. DRYDEN.
RUBBER TIRE.
APPLICATION FILED NOV. 1, 1902.
NO MODEL.
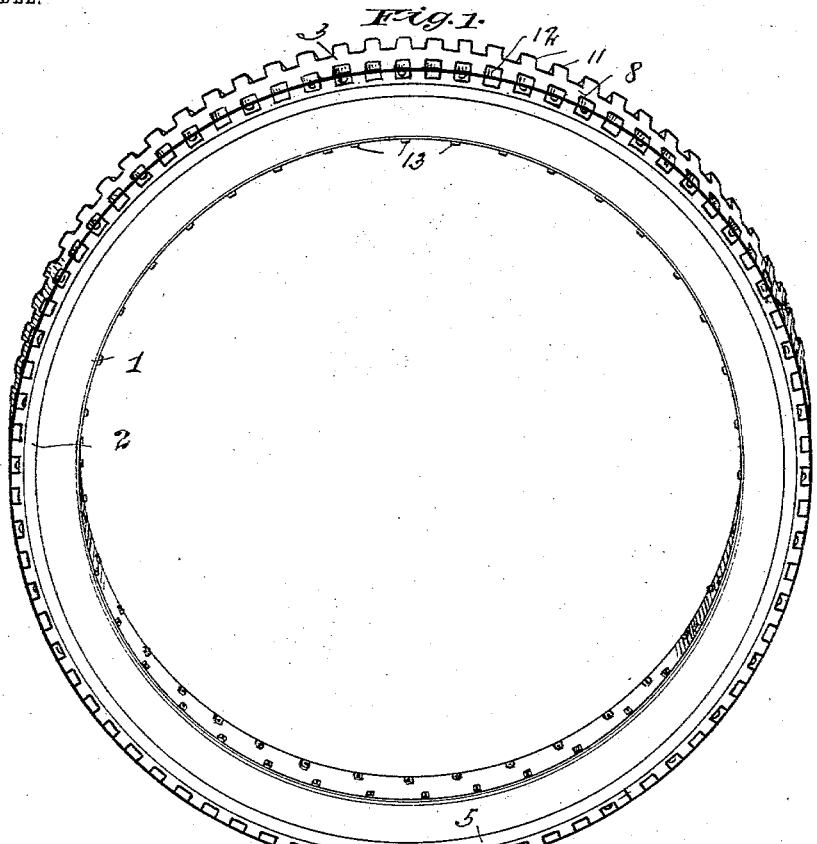
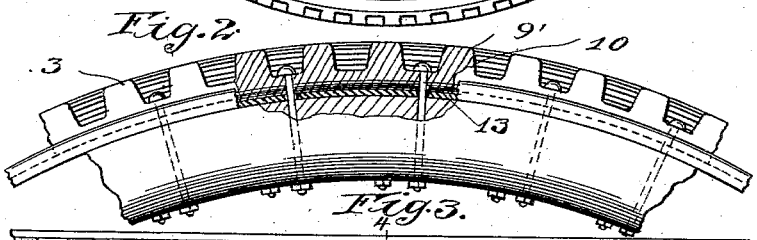
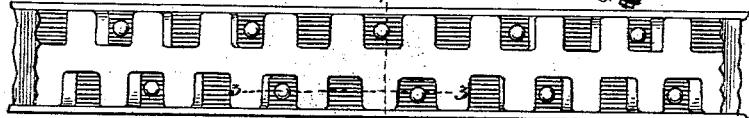
Witnesses,
Inventor,
George B. Dryden,
By Offield Towle Linthicum,
Att'ys.

No. 752,891. Patented February 23, 1904.

UNITED STATES PATENT OFFICE.

GEORGE B. DRYDEN, OF CHICAGO, ILLINOIS.

RUBBER TIRE.

SPECIFICATION forming part of Letters Patent No. 752,891, dated February 23, 1904.

Application filed November 1, 1902. Serial No. 129,771. (No model.)

*To all whom it may concern:*

Be it known that I, GEORGE B. DRYDEN, a resident of Chicago, in the county of Cook and State of Illinois, have invented certain new and useful Improvements in Rubber Tires, of which the following is a specification.

This invention relates to improvements in rubber tires for vehicle-wheels.

Among the salient objects of the invention are to provide a tire having improved traction qualities; to provide a construction which distributes the weight of the load over a relatively large tread area without increasing the cross-sectional size of the tire proportionately; to provide a construction which contributes to the easier-riding qualities of the vehicle by reason of the tread portion thereof being more free to expand under the weight of the load; to provide a construction possessing an increased ability to climb out of roads or over obstructions—as, for example, in crossing car-rails obliquely; to provide a construction which affords space for introducing the securing-bolts radially through the base portion of the tire and in such manner that the securing devices do not at all interfere with the action of the tire; and in general to provide an improved construction of the character referred to.

To the above ends the invention consists in the matter hereinafter described, and more particularly pointed out in the appended claims; and the invention will be more readily understood from the following description by reference to the accompanying drawings, forming a part thereof, and in which—

Figure 1 is a perspective view of a wheel-rim equipped with my improved tire. Fig. 2 is a view, partly in side elevation and partly in longitudinal sectional view, taken on line 2 2 of Fig. 3. Fig. 3 is a fragmentary plan or edge view, and Fig. 4 is a cross-sectional view taken on line 4 4 of said Fig. 3.

Referring to said drawings, in which the tire is shown as applied to an ordinary vehicle-wheel—as, for example, an automobile-wheel—1 designates as a whole the rim or felly portion of the wheel, 2 the channel-iron rim or tire applied thereto in the usual manner, and 3 the rubber tire proper. As shown, the outer face of the rim 1 is relatively broad, the metal rim 2 being made of equal width and provided in its outer face with a relatively shallow channel 4, formed between radial flanges 5. In the preferred construction the channel 4 has a flat bottom and parallel sides, but is not essentially of this form.

The rubber tire 3 comprises a base portion 6, which is desirably and as herein shown made of a thickness approximately equal to or slightly greater than the depth of the channel 4 and is composed as to its lower or base side of a plurality of plies of canvas 7, to which the superposed rubber tire proper is integrally vulcanized or secured in any usual manner. The tread portion of the tire comprises a central rib-like portion 8, the periphery of which is straight, desirably continuous, and bounded by two straight parallel circumferential lines. Abutting against and formed integrally with said central tread portion 8 at each side thereof is a series of lateral projections or tread extensions 9 and 9', which extensions are preferably of approximately equal height or radial thickness with the central portion 8 and form, in effect, lateral extensions of the tread-surface of the tire. Viewed in side elevation these portions 9 and 9' are preferably made more or less outwardly tapering, as indicated at 10, this construction obviously enabling the tire to free itself more readily from soft soils in rolling over the same. The outer lateral surfaces 11 of the extensions 9 and 9' and the sides 12 of the central member 8 intervening between said abutting portions may be parallel with the plane of the wheel or outwardly tapering, as preferred. The lateral extensions 9 and 9' are arranged in offset or staggered relation to each other, as shown clearly in Fig. 3. The lateral tread extensions 9 and 9' are provided at frequent intervals, the spaces intervening between said extensions being preferably and as shown herein approximately equal to the circumferential width of the base portions of said extensions.

In its broader purview a tire embodying the invention embodies a construction in which the tread-surface is notched or recessed at opposite sides, the laterally-extending walls which define such irregular tread-surface serving to afford an increased traction and also permitting those portions of the tire bounded by such laterally-extending sides to expand in the directions or the circumference of the tire as well as laterally thereto. It is obvious, therefore, that the exact construction shown is not essential. A tire having such lateral extensions or notched or recessed sides may be secured to the rim of the wheel in any preferred manner, but may be most advantageously mounted thereon by being seated within a channeled rim, as described, and secured by means of a plurality of bolts or screws 13, arranged to extend through those portions of the base of the tire exposed between the lateral abutments or extensions 9 and 9'. The securing bolts or screws 13 may be attached to the channeled rim only or, as shown in the present instance, inserted through the latter into the subjacent body of the wheel-rim. Obviously as many securing bolts or screws may be inserted as required to hold the tire securely in position, the spaces between said lateral extensions serving to accommodate the heads of the securing bolts or screws and in such manner as to entirely avoid interfering with the action of the tire.

In operation it will be obvious that the lateral extensions afford an increased tread-surface without proportionately increasing the cross-sectional size of the tire, and it will furthermore be understood that a tire so constructed possesses a high coefficient of resilience under load because of the relatively small cross-sectional area of the central or main tread member and the freedom of the lateral extensions to expand laterally in all directions except toward that side at which they are joined to the central member. In passing over track-rails or analogous obstructions obliquely and in leaving ruts these lateral extensions serve to promptly engage and cause the wheel to climb up such obstructions, thus practically relieving the wheel from the heavy stress to which wheels equipped with tires of ordinary construction are subject under such circumstances. It will also be noted that the fact that the securing-bolts are inserted directly and radially through the base of the tire and through portions devoid of movement under working pressure insures that the tire will not be worn or cut by such securing devices, and thus adds materially to the life of the structure. The mean line of the tread-surface of a tire constructed as described is crooked or deflected from side to side in an approximately undulatory shape, and consequently the traction-grip of the wheel is much greater than in the case of an equal area of tread-surface which is unnotched and has straight parallel boundary sides. This increased traction effect is more pronounced when the surface over which the wheel is traveling is soft, since the lateral extensions then act like cogs to engage the road-bed. For self-propelled vehicles, therefore, a tire embodying my invention possesses a special utility.

I claim as my invention—

1. A resilient vehicle-tire comprising a continuous tread portion, and a series of separated, peripherally short, lateral extensions integral therewith, and having their peripheral surfaces in the plane of the tread.

2. A resilient tire for vehicle-wheels comprising a continuous tread portion, and a series of peripherally short, separated lateral extensions integral with the tread and arranged with their peripheral surfaces in the plane thereof, said extensions having transverse faces disposed approximately radially relative to the wheel.

3. A tire for vehicle-wheels comprising a central continuous tread portion, and integral lateral extensions on both sides thereof arranged in alternating relation with their peripheral surfaces in the plane of the tread, said extensions being peripherally short and having their transverse faces disposed approximately radially relative to the wheel.

4. A resilient tire for vehicle-wheels comprising in an integral structure a relatively wide, flat base, a relatively narrow, single, continuous tread portion, and lateral extensions from said tread portion laterally continuous with the base, and having substantially rectangular transverse faces disposed approximately radially relative to the wheel.

5. In a solid, resilient, vehicle-tire, an integral structure comprising a relatively wide, thin base, a relatively narrow, thick tread, and peripherally short, lateral extensions therefrom having their exterior surfaces in the plane of the tread.

6. A resilient vehicle-tire comprising a continuous tread portion, and separated lateral extensions therefrom forming alternating recesses, said recesses being contracted from opposite sides toward the inner periphery of the tire.

7. In a vehicle-tire, an integral, resilient structure comprising a flat base portion, a continuous elevated tread, slightly tapered toward its outward periphery, and separated lateral extensions therefrom each having its lateral faces slightly inclined to give said extensions an outward taper, whereby the recesses between the extensions are contracted toward the base thereof.

8. The combination of a felly, a tire comprising a base, a relatively narrow, continuous, tread portion, and separated peripheral extensions formed integral with the tread and base, and means for securing the base to the felly intermediate the extensions.

9. The combination of a felly, a rim secured thereto, a tire comprising a base, a relatively narrow tread, separated peripheral extensions formed integral with said base and tread portions, and means for securing the tire to the rim arranged to extend through the tire-base intermediate the extensions.

10. In a vehicle-wheel, a channel-rim having outwardly-projecting flanges at its edges; a tire comprising a base adapted to fit between the flanges of the rim, an elevated continuous tread and separated lateral projections therefrom; and means for securing the tire to the rim arranged to pass through the base thereof and disposed intermediate the elevated tread and the edge of the base.

11. A resilient vehicle-tire comprising a continuous tread portion, and separated lateral extensions therefrom between which are formed recesses, said recesses being contracted from opposite sides toward the inner periphery of the tire.

GEORGE B. DRYDEN.

Witnesses:
ALBERT H. GRAVES,
HARRY E. DOTY.